(12) United States Patent
Tan

(10) Patent No.: US 7,331,722 B2
(45) Date of Patent: Feb. 19, 2008

(54) OPTICAL MODULE FOR HOUSING AN OPTICAL COMPONENT

(75) Inventor: Chee Siong Tan, Singapore (SG)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 0 days.

(21) Appl. No.: 10/839,819

(22) Filed: May 5, 2004

(65) Prior Publication Data

US 2005/0249474 A1 Nov. 10, 2005

(51) Int. Cl.
G02B 6/42 (2006.01)
(52) U.S. Cl. .................................. 385/92; 385/135
(58) Field of Classification Search ............ 385/88–94, 385/135

See application file for complete search history.

(56) References Cited

U.S. PATENT DOCUMENTS

| | | | | |
|---|---|---|---|---|
| 4,243,297 A | * | 1/1981 | Elion | 385/24 |
| 4,834,481 A | * | 5/1989 | Lawson et al. | 385/44 |
| 4,861,134 A | * | 8/1989 | Alameel et al. | 385/135 |
| 5,109,983 A | | 5/1992 | Malone et al. | |
| 5,119,459 A | * | 6/1992 | Meyerhoefer et al. | 385/135 |
| 5,202,893 A | * | 4/1993 | Kubota et al. | 372/34 |
| 5,235,665 A | * | 8/1993 | Marchesi et al. | 385/135 |
| 5,469,526 A | * | 11/1995 | Rawlings | 385/135 |
| 5,596,670 A | * | 1/1997 | Debortoli et al. | 385/135 |
| 5,659,641 A | * | 8/1997 | DeMeritt et al. | 385/14 |
| 5,703,990 A | * | 12/1997 | Robertson et al. | 385/135 |
| 5,915,061 A | * | 6/1999 | Vanoli | 385/135 |
| 6,118,914 A | * | 9/2000 | Davis et al. | 385/37 |
| 6,144,792 A | * | 11/2000 | Kim et al. | 385/135 |
| 6,147,795 A | * | 11/2000 | Derbyshire et al. | 359/337 |
| 6,334,020 B1 | * | 12/2001 | Fujimori et al. | 385/134 |
| 6,381,394 B1 | * | 4/2002 | Cabrera et al. | 385/135 |
| 6,498,878 B1 | * | 12/2002 | Ueda | 385/37 |
| 6,741,785 B2 | * | 5/2004 | Barthel et al. | 385/135 |
| 6,795,633 B2 | * | 9/2004 | Joseph | 385/135 |
| 6,816,531 B1 | * | 11/2004 | Rossin et al. | 372/64 |
| 6,860,642 B2 | * | 3/2005 | Vodrahalli et al. | 385/53 |
| 2002/0191937 A1 | | 12/2002 | Knox et al. | |
| 2003/0085212 A1 | | 5/2003 | Crafts et al. | |

FOREIGN PATENT DOCUMENTS

DE 4417767 11/1995
WO WO-02070386 9/2002

\* cited by examiner

Primary Examiner—Rodney Bovernick
Assistant Examiner—Mike Stahl

(57) ABSTRACT

An optical module for housing an optical component to which optical fibers are to be connected, the optical module comprises a casing; at least two round fiber guides which are arranged within the casing, spaced at a distant from each other and around which the optical fibers can be wound; an accommodating space between the two round fiber guides for accommodating the optical component; and at least one opening provided in the casing and being arranged adjacent to one of the round fiber guides for external connections to be made.

27 Claims, 11 Drawing Sheets

OPTICAL MODULE FOR HOUSING AN OPTICAL COMPONENT

BACKGROUND OF THE INVENTION

This invention relates to an optical module. In particular, the invention relates to an Arrayed Waveguide Grating (AWG) module.

Arrayed Waveguide Grating (AWG) devices are commonly used in Wavelength Division Multiplexing (WDM) systems for multiplexing (combining) optical signals of different wavelengths onto a single optical signal. An AWG device operating in this way shall be considered as operating in a forward sense. AWG devices can also be operated in a reverse sense for demultiplexing (splitting) a multiplexed optical signal into a plurality of constituent optical signals of different wavelengths. The different wavelengths correspond to different channels in the WDM system with channel spacings typically being in the order of 1 nm.

An AWG device has two optical interfaces arranged at opposite ends of the device. Each optical interface can function as an input or an output of the AWG device depending on whether the AWG device is operating in a forward or reverse sense. In the forward sense, the first optical interface functions as an input for receiving multiple optical signals via separate optical fibers. The optical fibers are bundled at the input interface of the AWG device, and are accurately aligned in a side-by-side arrangement with the individual optical channels of the input. The second optical interface functions as an output for outputting a single multiplexed optical signal onto a single output optical fiber. The single output optical fiber is accurately aligned at the output interface of the AWG device. When the AWG device operates in the reverse sense, the output interface functions as an input, and the multiple channel input interface functions as a multiple channel output interface.

The optical fibers are attached to the optical interfaces of the AWG device by means of a V-groove block. The attachment of the optical fibers to the AWG device is a one time process which must be performed with precise instruments under well-defined temperature conditions. For this and other reasons, AWG devices are typically supplied with the optical fibers pre-attached, and with the AWG device contained in a protective housing. AWG devices assembled in this way are available from manufacturers such as NTT Electronics (NEL) of Japan, and shall be referred to herein as AWG modules.

FIG. 1 shows a known AWG module 100 installed on a board 110 of a rack-mount system. The board 110 can be mounted horizontally or vertically in the rack-mount system. When mounted, a front edge 112 of the board is generally exposed to provide input and output connections to the board 110.

The AWG module 100 generally comprises a AWG device 102, a housing 120, and a series of optical fibers 103, 104. Optical fiber 103 is connected at one end to an optical interface of the AWG device 102, and at the other end to an optical connector 105. An optical fiber bundle 104, comprising 32 individual optical fibers, is connected at one end to the AWG device 102, and at the other end to four separate 8-channel optical connectors 106, 107, 108, 109. The optical fiber bundle 104 is grouped into 4 sets of 8 optical fibers, each set being represented by a single line in FIG. 1. Each set of 8 optical fibers is covered by a protective sleeve or sheath, and is coupled to a different optical connector 106, 107, 108, 109. The protective sleeves help to prevent the delicate fibers from breaking.

The optical connectors 105, 106, 107, 108, 109 act as inputs or outputs for the AWG module 100 and the board 110.

Each optical fiber in the optical fiber bundle 104 corresponds to a communication channel. Accordingly, the AWG module of FIG. 1 is a 32 channel AWG module. AWG modules are also available, for example, in 8, 16, and 40 channel versions.

The AWG module 100 includes a housing 120 which surrounds and helps to protect both the AWG device 102 and the attachments between the AWG device 102 and the optical fibers 103, 104. The optical fibers 103, 104 extend outside of the housing 120 via openings at opposite ends of the housing 120. Strain relief bushings 122, 124 are provided on the housing 120 to prevent the optical fibers 103, 104 from kinking against the leading edge of the openings.

In general, optical fibers used in AWG modules are extremely delicate and can be damaged when the radius of curvature along their length is reduced below a minimum value, typically about 17 mm. The radius of curvature of an optical fiber is significantly reduced when the fiber is bent too tightly or when the fiber is kinked against a sharp edge. Damage to an optical fiber can also occur from direct impact or abrasion to an unprotected region of the fiber. In the AWG module 100 of FIG. 1, the vulnerable regions of the fibers are the exposed regions, especially around the optical connectors 105, 106, 107, 108, 109, and the bushings 122, 124.

As mentioned, the attachment of the optical fibers to the AWG device is a precision operation, and the AWG module of FIG. 1 includes a housing to help protect the attachments between the AWG device 102 and the optical fibers 103, 104. Nevertheless, the attachments between the AWG device 102 and the optical fibers 103, 104 are prone to damage when tensile forces are applied to the optical fibers 103, 104 pulling the fibers out from the housing 102. The strain relief bushings 122, 124 provide no protection from tensile forces applied to the fibers.

AWG modules are typically shipped to customers in protective packaging. The customer then removes the AWG module from the packaging, and installs the AWG module onto a board for use in a rack-mount system, as shown in FIG. 1. The steps of packaging the AWG module, shipping the AWG module, removing the AWG module from the packaging, and installing the AWG module onto a board all increase the likelihood of the AWG module being damaged. Damage can occur to the optical fibers themselves, or to the attachments between the AWG device 102 and the optical fibers 103, 104. To help prevent damage to the AWG module, the steps mentioned above are performed with great care, usually requiring more than one person.

Improvements in packaging techniques for the AWG module can reduce the likelihood of damage during shipping but often result in greater labor in the packing and unpacking steps. For example, mechanical clips can be used to hold down the optical fibers and connectors in a shipping box but require delicate handling to clip and unclip the fibers.

If a customer is not made aware of the careful handling requirements for the AWG module then damage can often occur to the AWG module which can be costly and time consuming.

SUMMARY OF THE INVENTION

According to a first aspect of the present invention, there is provided an optical module, comprising; an optical component, an optical fiber coupled to the optical component, and a housing for housing the optical component and the optical fiber, the housing comprising a fiber guide which defines a curved surface for guiding the optical fiber along a curved path.

An optical module in accordance with the invention has an advantage that by guiding the optical fiber along a curved path, the optical module can help to prevent damage to the optical fiber or the coupling between the optical fiber and the optical component.

The fiber guide may comprise a single guide element to define the curved surface or may comprise multiple guide elements to define the curved surface. The curved surface may even be defined by a series of pegs aligned along a curve.

The fiber guide may define one or more convex curved surface portions against which the optical fiber is guided in a curved path. A convex curved surface has the advantage that the radius of the convex curved surface can be chosen to be greater than the minimum recommended radius of curvature of the optical fiber. Thus, the convex curved surface can help prevent the optical fiber from being damaged by being bent too tightly.

The fiber guide may also or alternatively define one or more concave curved surfaces against which the optical fiber is guided in a curved path. An advantage of guiding the optical fiber along a curved path within a concave surface is that it helps to prevent tensile forces applied at one end of the fiber from translating into tensile forces at the other end of the fiber. By absorbing the tensile forces applied at the free end of the fiber, there is less likelihood of damage to the coupling between the fiber and the optical component at the other end of the fiber.

Ideally, the fiber guide defines a concave curved surface portion surrounding a convex curved surface portion whereby the optical fiber is guided in a curved path between the concave and convex curved surface portions.

According to a second aspect of the present invention, there is provided an optical module for housing an optical component to which optical fibers are to be connected, the optical module comprises a casing, at least two round fiber guides which are arranged within the casing, spaced at a distant from each other and around which the optical fibers can be wound, an accommodating space between the two round fiber guides for accommodating the optical component, and at least one opening provided in the casing and being arranged adjacent to one of the round fiber guides for external connections to be made.

When the first and second optical fibers are wound around at least one of the round fiber guide, any stress on the optical fibers is isolated from the fiber attachment regions, i.e. the regions where the optical fibers are connected with another component, which are the weakest regions of the optical fibers.

Often, optical fibers are supplied with a length ranging between 1 and 2 meters. The optical fibers supplied, for example by the Sumitomo company of Japan, are generally 2 meters in length, with a tolerance length of approximately 0.1 meters. The use of round fiber guides advantageously allows optical fibers of different lengths to be used; with longer fibers being wound around the round fiber guides in a greater number of turns than shorter fibers.

When the optical component is arranged between the two round fiber guides, the optical fibers from the optical component can be wound around either one of the round fiber guide, or both the round fiber guides easily, without causing sharp bending of the fibers thereby causing undue stress. For the same reason, the at least one opening of the optical module is arranged adjacent to one of the round fiber guides, so that the optical fibers can be guided to the at least one opening without excessive bending and thereby keeping the stress on the optical fibers minimal.

At least one guiding element, for example one or more guide pins or one more guiding channels, is/are preferably provided in the optical module between the round fiber guides and the at least one opening. The guiding element serves as arrangement means and provides a plurality of spaces for guiding the optical fibers to the at least one opening, hence providing an orderly arrangement of the optical fibers in the optical module.

The accommodating space for accommodating the optical component is preferably arranged partially within one of the round fiber guides, so that part of the optical fibers from the optical component can be guided into the round fiber guide directly, allowing a more efficient and compact way of winding the optical fibers around the round fiber guides.

The respective round fiber guide should preferably have an inner wall and an outer wall, and the optical fibers are guided in a channel defined between the inner wall and the outer wall. In particular, the inner and outer walls are circular and are arranged concentrically with each other. However, it should be noted that a round fiber guide only mean that the fiber guide, including the inner wall and the outer wall, is in its basic shape, round shaped. Therefore, it also encompass oval, elliptical, curved shaped, or even a polygon made up of many segments that is essentially, or in its basic form, round. Of course the fiber guide is preferably provided with smooth surfaces to be contacted with the optical fibers in order to avoid any damages thereof.

The channel defined between the inner wall and the outer wall is preferably designed to have a width, for example approximately 12 millimeter for a 8-channel optical module as shown in FIG. 2, which is able to cater for differences in the length of the optical fibers due to the length tolerance of the optical fibers supplied by suppliers. Such arrangement allows for a smaller variation or difference in the length of the optical fibers supplied. Fibers which are slightly longer may be wound in a diameter closer to the diameter of the outer wall if the fiber is not long enough to be wound an additional turn around the inner wall of the fiber guide, and conversely, fibers which are slightly shorter may be wound in a diameter closer to the diameter of the inner wall.

Therefore, the use of the optical fibers which fall within the tolerance length variation as specified by the supplier in the optical module, specifically AWG module, can be ensured.

The at least one opening and the accommodating space of the optical module should preferably be arranged on the same side with respect to a line connecting the centers of the two round fiber guides. Also, the opening of the optical module preferably has a center line substantially directed to the space between the round fiber guides. Such an arrangement of the opening and the accommodating space provides a smoother layout of the optical fibers in the optical module, and hence reducing unnecessary bending of the optical fibers which can result in undue stress. When two or more openings are provided, the plurality of openings are then preferably arranged adjacent to one another, with their respective center lines parallel to one another.

The optical module according to the invention may further comprise a heating or cooling unit, for example a Thermoelectric Cooler (TEC) or a heater, and at least one temperature sensor to ensure that the optical module operates in a correct temperature. A plurality of input/output (I/O) pins are coupled to the heating or cooling unit and the temperature sensor, and extend to the exterior of the optical module. The I/O pins provide power to the heating or cooling unit and temperature feedback to external electronic board for controlling the temperature.

A packing foam material is preferably provided to fill up the empty regions around the optical fibers in the optical module, so that the fibers can be secured firmly in the module and hence preventing damage to the optical component and optical fibers during shipping and other movements. Alternatively, a spool can be detachably arranged in at least one of the round fiber guides wherein the optical fibers are wound around the spool serving as the inner wall. Of course the inner wall can also be formed by round protrusion fixed to the casing. The top plate of the spool is also able to secure the optical fibers which are wound around the spool. The fibers can be wound around the spool separately before arranging the spool into at least one of the fiber guide. The outer wall is preferably form by an circumferentially wall of the casing itself. However, the outer wall may also be form by an additional ring part inserted into the casing or integrally formed therewith.

The casing of the optical module according to the invention should preferably comprise of a main body, a top cover and a swing cover, which when assembled form a protective cover for the optical module, providing external protection to the optical component enclosed within. The swing cover covers a portion of the main body above the opening, and can be removed to expose the openings, in particular adapters accommodated in the openings. This allows the optical fibers connected to the openings or adapters to be changed easily if needed. Also, the openings or the adapters arranged in the openings can be cleaned easily by removing the swing cover. The main body preferably comprises the fiber guides and the accommodating space as well as the at least one opening and the guiding element, wherein the main body is preferably integrally formed with these parts.

In alternative embodiments of the invention, the optical module may simply comprise of a main body and a top cover which covers the entire main body. A single casing for the entire optical module may also be used instead.

The main body, top cover and the swing cover are preferably held together using magnetic force. The magnetic force is provided by inserting magnetic materials in at least one region in the main body, and corresponding regions in both the top cover and the swing cover. The use of magnetic force makes the assembling and dismantling of the optical module simple and clean, without having to use any additional tools.

It should be noted that the main body, top cover and the swing cover may be held together using other methods like screwing or nailing. Any other form of adhesive methods are also possible in other alternative embodiments.

The at least one opening of the optical module is preferably in the form of elongated slots, so that an elongated adapter can be accommodated in each of the openings. Connectors are usually provided at the end of optical fibers, and the adapters accommodated in the elongated slots receive the connectors of the optical fibers, and hence provide the interface between the optical module and the exterior. Since the connectors of the optical fibers are connected to the adapters and are not exposed to the exterior directly, stress resulting from external connections through the openings will not be transferred to the optical fibers.

Alternatively, the adaptors can be integrally formed with the at least one opening, so that separate adaptors need not be arranged in the at least one opening of the optical module and the connectors of the optical fibers can be connected to the at least one adaptor-integrated opening. This allows the at least one opening of the optical module to be smaller, thereby resulting in a more compact optical module.

It can be seen that the optical module according to the invention is a compact and effective package that provides easy handling of the optical components, in particular AWG devices, during packing, unpacking, and installation. Further, the optical module can be mounted directly onto a board of the rack-mount system to be used, eliminating the tedious way of mounting the AWG module to the board according to the arrangement shown in FIG. 1. When the optical module is mounted on the board, it is preferably inclined such that the angle enclosed between the longitudinal center line of the opening of the optical module and the edge of the board is less than 90 degrees. This arrangement allows the door of the rack-mount system to be positioned nearer to the board without stressing the external connections.

The size of the optical module according to the invention can be expanded accordingly by having more openings, if more channels of the AWG module are needed. The center lines of the respective openings are parallel to one another.

The optical component may be of any type of optical component to be arranged in a module. So also an optical amplifier or an optical coupler or an optical chip or combinations thereof may form the optical component.

The above and other features and advantages of the invention will become apparent from the following description and the appended claims, taken in conjunction with the accompanying drawings in which like parts or elements are denoted by like reference numbers.

DETAILED DESCRIPTION OF THE PREFERRED EMBODIMENT OF THE INVENTION

A preferred embodiment of the invention will now be described with reference to the accompanying drawings.

An optical module in accordance with one embodiment of the invention comprises a housing or casing having a main body, a top cover and a swing cover, wherein the top cover and the swing cover together cover the main body when assembled together.

Figure 1:
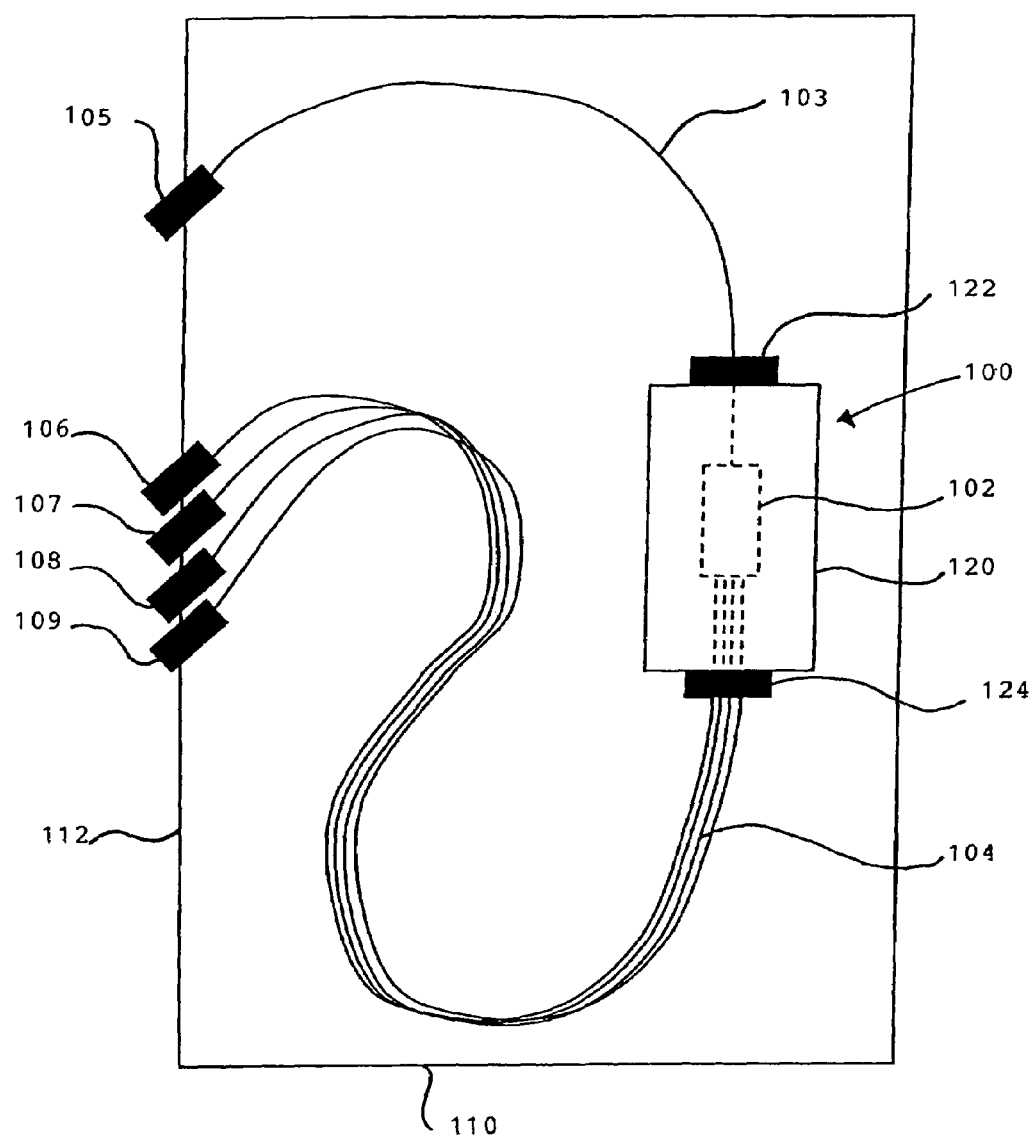
FIG. 1 shows a typical prior art layout of a known AWG module mounted on a board for use in a rack-mount system.
Figure 2:
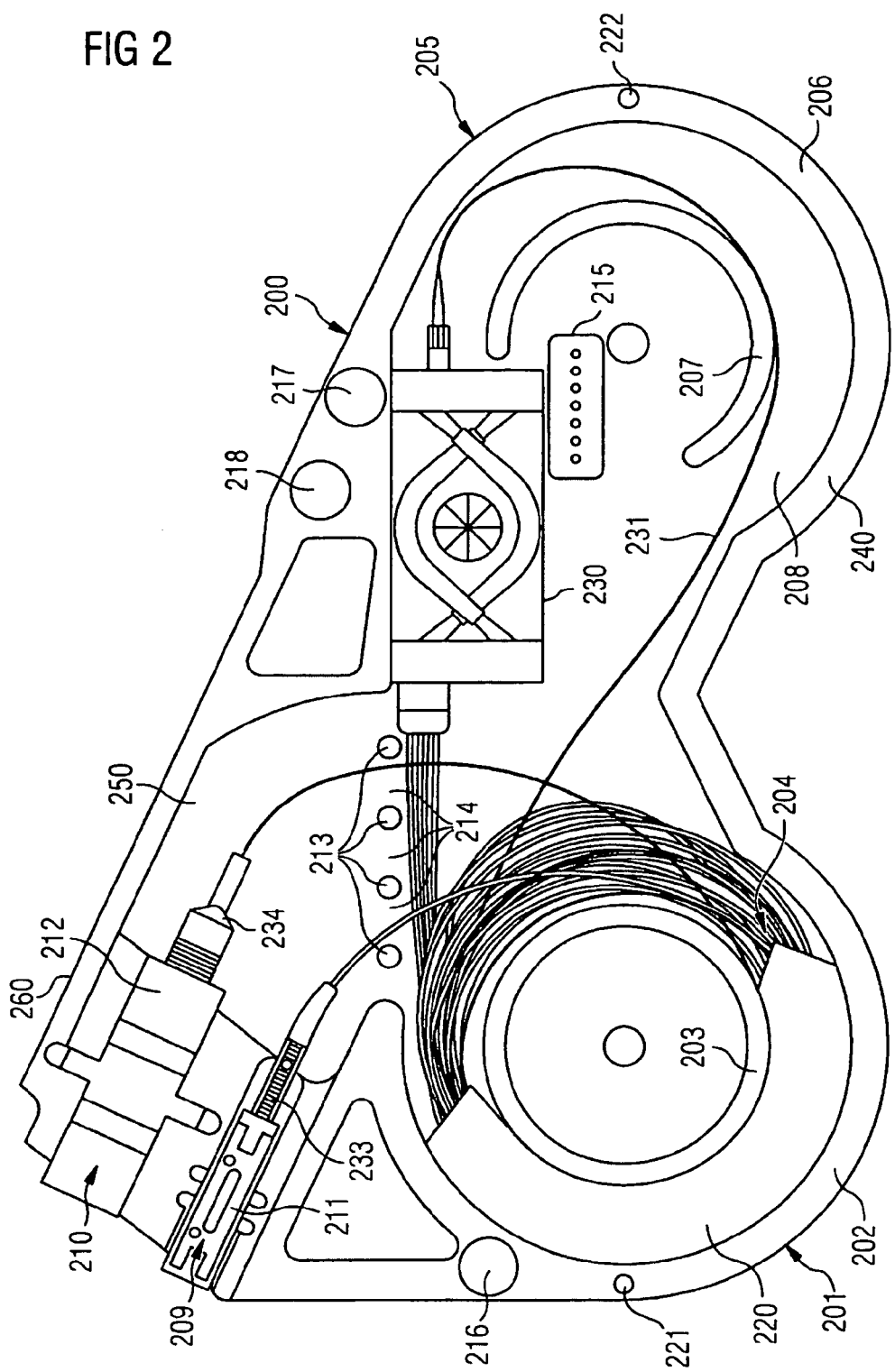
FIG. 2 shows the main body of the optical module according to a preferred embodiment of the invention.

FIG. 2 shows the main body 200 of the optical module according to the preferred embodiment of the invention. The main body 200 is generally planar and comprises a planar base wall 250, and a perimeter side wall 240 extending generally perpendicular from the base wall 250. The perimeter side wall 205 extends around the periphery of the main body 200 except for two openings 209, 210.

An optical component in the form of an AWG device 230 is mounted on the main body 200, and optical fibers are coupled to and extend from each end of the AWG device 230.

The main body 200 includes a fiber guide comprising a first round guide 201 and a second round guide 205. With respect to the orientation of the drawing in FIG. 2, the first round fiber guide 201 and the second round fiber guide 205 are positioned at a lower part of the main body 200, and spaced apart from each other at opposite ends of the main body 200.

The first round guide 201 comprises an inner wall 203 which is circular in shape, and an outer wall 202 enclosing or surrounding more than half of the inner wall 203 in a concentric manner. The outer wall 202 has a larger diameter than the inner wall 203, and is in a form of a circular arc, forming part of the perimeter side wall 240. A channel 204 is therefore provided between the inner wall 203 and the outer wall 202 for guiding optical fibers from an optical component, in particular an AWG device, which will be described later. The portion of the inner wall 203 exposed to the channel 204 defines a continuous convex surface for guiding the optical fibers. The portion of the outer wall 202 exposed to the channel 204 defines a concave surface for guiding the optical fibers. In another embodiment, the continuous convex surface and the concave surface may be formed from multiple wall elements.

The second round fiber guide 205 comprises an inner wall 207 and an outer wall 206 arranged concentrically. Both the inner wall 207 and the outer wall 206 are in a form of a circular arc, with the outer wall 206 having a larger diameter than the inner wall 207 and forming part of the perimeter side wall 240. A channel 208 is also provided between the inner wall 207 and outer wall 206 of the second round fiber guide 205 for guiding optical fibers from the AWG device. The portion of the inner wall 207 exposed to the channel 208 defines a convex surface for guiding the optical fibers. The portion of the outer wall 206 exposed to the channel 208 defines a concave surface for guiding the optical fibers.

The width of the channels 204, 208 between the respective inner walls 203, 207 and outer walls 202, 206 of the fiber guide 201, 205 is preferably about 12 millimeters. The channel width in this embodiment is designed to cater for variations in the length of the optical fibers. As mentioned, optical fibers are often provided at different lengths, and even when a specific length is request, the optical fiber can often have a length tolerance of up to 10 cm. It should be noted that the width of the channels 204, 208 may be different in alternative embodiments.

Two openings in form of elongated slots 209, 210 are provided in the main body 200, adjacent to the first round fiber guide 201 for receiving a first adapter 211 and a second adapter 212. The adapters 211, 212 have one end facing the interior of the main body 200 to receive optical connectors 233, 234 attached to the ends of the optical fibers, and the other end exposed to the exterior of the main body 200 for external connections.

The elongated slots 209, 210 are arranged side-by-side with parallel longitudinal axes. The longitudinal axes of the slots 209, 210 are orientated at an acute angle, for example 40 degrees, relative to an imaginary axis extending between the centers of the two fiber guides 201, 205.

The fiber guide further comprises four guiding elements, in particular four guide pins 213, arranged in a row between the elongated slots 209, 210 and the first and second round fiber guides 201, 205. The guide pins 213 form a comb-like arrangement and defines a plurality of spaces 214 between the guide pins 213 or between one of the guide pin 213 and the side wall 240 of the main body 200. The purpose of the guide pins 213 is to guide the optical fibers of through the spaces 214 to the adapters 211, 212 in an orderly sequence. The pins may also be arranged in any other appropriate manner, or guide channels may be provided as an alternative.

An array of input/output (I/O) pins 215 are arranged in the base wall 250 in a position near the center of the arc of the inner wall 207 of the second round fiber guide 205. There are six I/O pins 215 in the array; 2 pins for providing power to a heating or cooling unit (not shown), for example a Thermoelectric Cooler (TEC) or a heater, 2 pins for providing feedback information from a temperature sensor (not shown), and 2 pins for providing feedback information from a backup temperature sensor (not shown). The I/O pins 215 extend through the base wall 250 to an exposed side of the main body 200.

A first cylindrical magnet 216 is embedded into the perimeter side wall 240 near the first round fiber guide 201. A second cylindrical magnet 217 is embedded in the perimeter side wall 240 near second round fiber guide 205. A third cylindrical magnet 260 is also embedded at the side of the perimeter side wall 240 near the adapter slot 210. The embedded magnets provide an attractive magnetic force for holding the main body 200, the top cover and the swing cover together, when assembled.

A cylindrical hole 218 is provided in the perimeter side wall 240, on the left and slightly above the second round magnet 217, for receiving a complementary-shaped hinge of the swing cover (see later). When the hinge of the swing cover is received into the cylindrical hole 218, it acts as a pivot for the swing cover to be removed partially from the main body 200, without being completely detached.

Two locating pins 221, 222 are provided at each end of the main body 200. The locating pins 221, 222 are for insertion into corresponding locating holes of the top cover during assembly, to ensure that the top cover is correctly positioned over the main body 200.

Figure 3:
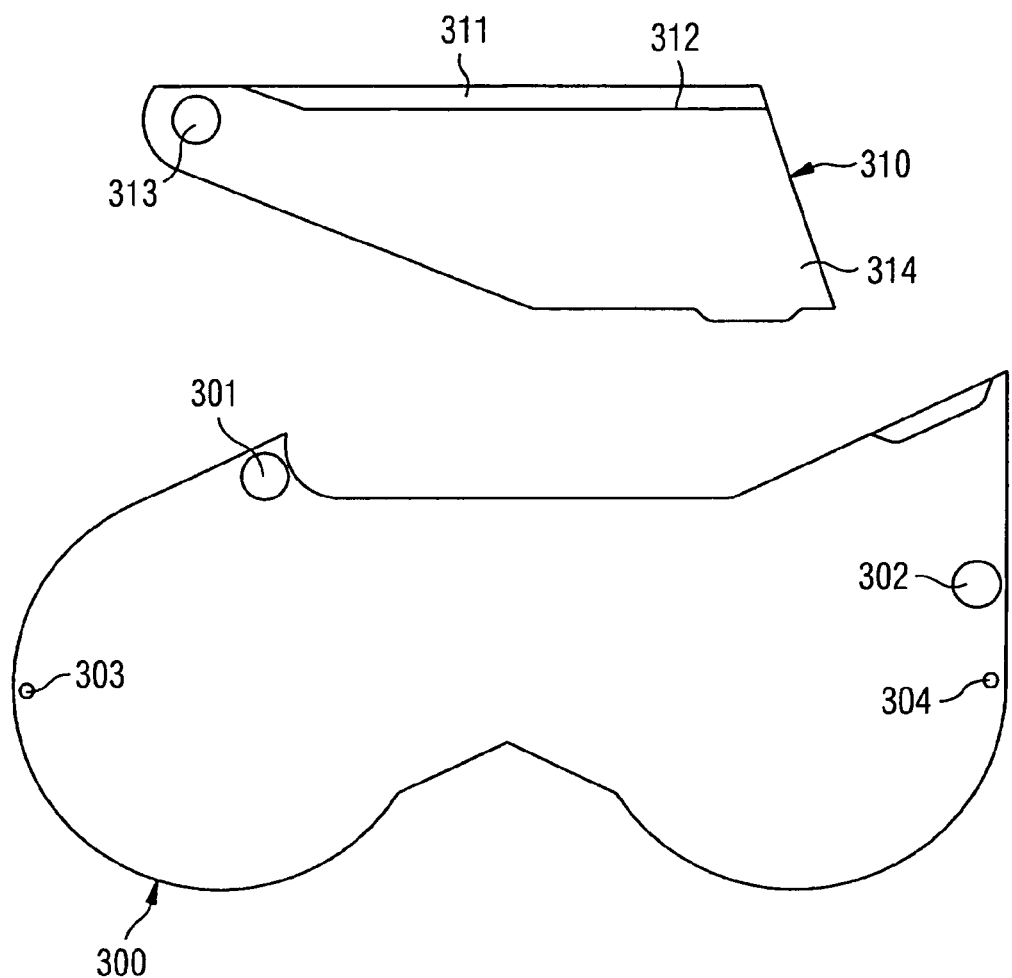
FIG. 3 shows the swing cover and the top cover of the optical module according to a preferred embodiment of the invention.

FIG. 3 shows the top cover 300 and the swing cover 310.

The top cover 300 is designed to cover the portion corresponding to the two round fiber guides 201, 205 of the main body 200, and has a contour following the contour of the corresponding lower portion of the main body 200.

The surface of the top cover 300 shown in FIG. 3, is the surface which faces the main body 200 when the top cover is assembled onto the main body 200.

Two cylindrical pins 301, 302, made of a ferromagnetic material such as steel, are embedded in the top cover 300. The position of the pins 301, 302 correspond to the position of the magnets 216, 217 of the main body 200, such that when the top cover 300 is assembled on the main body 200, the pins 301, 302 are positioned above the magnets 217, 216 respectively of the main body 200.

Two locating holes 303, 304 are provided at two ends of the top cover 300 to receive the locating pins 222, 221 respectively of the main body 200 when the top cover 300 is assembled on the main body 200.

The swing cover 310 is designed to cover the remaining portion of the main body 200 not covered by the top cover 300, in particular the adapters 211,212 and the corresponding attached optical connectors 233, 234. The main surface 314 shown in FIG. 3, is the surface facing the main body 200 when the swing cover 310 is assembled onto the main body 200.

A wall 311 extends substantially perpendicular from one edge of the swing cover 310. A cylindrical pin 312, made of a ferromagnetic material such as steel, is embedded at the side of the wall 311 facing the main surface, corresponding to the position of the third magnet of the main body 200. In other words, when the swing cover 310 is assembled on the main body 200, the pin 312 touches the third magnet 260 of the main body 200, holding the swing cover 310 to the main body 200 by an attractive magnetic force.

A cylindrical hinge 313 extends from one end of the swing cover 310. The cylindrical hinge 313 is inserted into the cylindrical hole 218 in the main body. When assembled onto the main body 200, the swing cover 310 is held in position by the attractive magnetic force exerted by the magnet 260 of the main body 200 on the pin 312 of the swing cover 310. The swing cover 310 can be pivoted about the cylindrical hinge 313 and slid out of position partially to expose the adapters 211,212 in the main body 200, without detaching the swing cover 310 from the main body 200.

Figure 4:
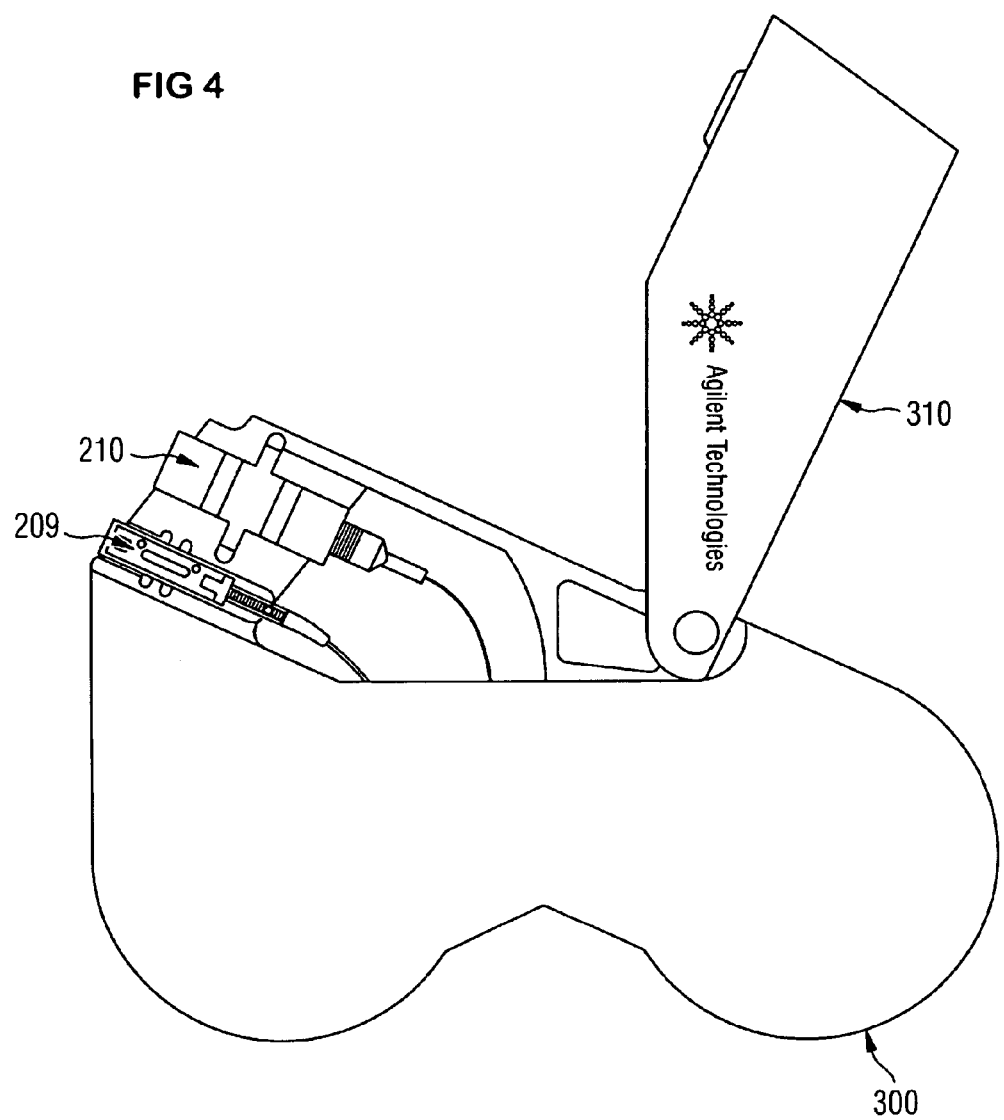
FIG. 4 shows the swing cover and the top cover assembled on the main body according to a preferred embodiment of the invention.

FIG. 4 shows the arrangement of the swing cover 310 and the top cover 300 assembled onto the main body 200. The swing cover 310 is shown in the open position to expose the openings 209, 210 of the main body 200.

Referring to FIG. 2, there is shown an AWG device 230, a first optical fiber 231 and a second optical fiber bundle 232, which is placed inside the main body 200.

The AWG device 230 is placed in an accommodating space between the two fiber guides 201, 205 and in a position above the I/O pins 215. The second optical fiber bundle 232 extends from the AWG device 230 into the fiber guide channel 204 of the first round fiber guide 201. The second optical fiber 232 is then guided around the inner wall 203, in the fiber guide channel 204 of the first round fiber guide 201 in an anti-clockwise direction. The number of turns the first optical fiber 231 has around the inner wall 203 depends on the length of the fiber bundle 232. The second optical fiber bundle 232 is finally guided through a space 214 between the guide pins 213 to the second adapter 210. The second adapter 210 receives the second optical fiber bundle 232 via a second optical connector 234 attached to the end of the optical fiber bundle 232.

The first optical fiber 231 extends from the AWG device 230 into the fiber guide channel 208 of the second round fiber guide 205. The first optical fiber 231 arcs around the second round fiber guide 205 in a clockwise direction, and is further extended into the first round fiber guide 201. The first optical fiber 231 is then guided around the first round fiber guide 201 in an anti-clockwise direction. The number of turns the first optical fiber 231 has around the inner wall 203 of the first round fiber guide 201 depends on the length of the first optical fiber 231. The first optical fiber 231 is finally guided through another space 214 between the guide pins 213 to the first adapter 211. The first adapter 211 receives the first optical fiber 231 via a first optical connector 233 attached to the end of the first optical fiber 231.

A packing foam material 220 is optionally provided in the fiber guide channel 204 of the first round fiber guides 201 to pack the first and second optical fibers 231, 232 in position against the base wall 250 of the main body 200. This prevents the optical fibers 231, 232 from excessive movement during shipping, which may cause undue stress to the optical fibers 231, 232.

Figure 6:
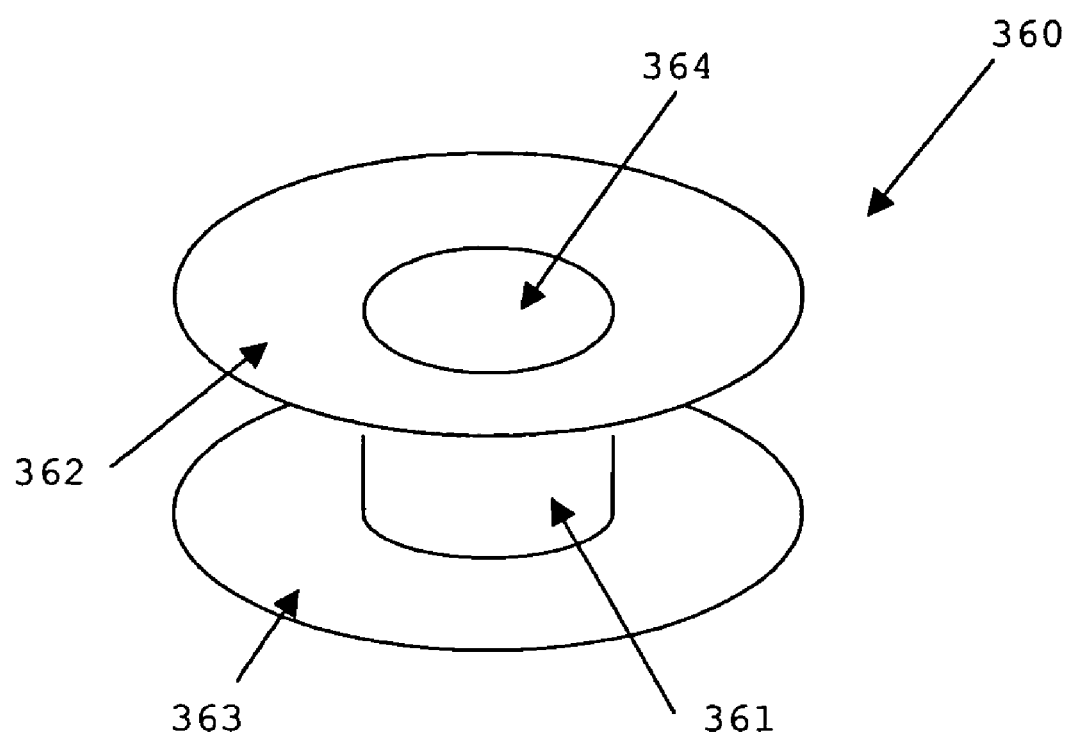
FIG. 6 shows a spool which may be arranged in at least one of the fiber guide in accordance with the invention.

Alternatively, a spool 360 shown in FIG. 6 can be used instead of the packing foam material for securing the optical fibers 231,232. The spool 360 comprises of a top plate 362, a bottom plate 363 and a narrower cylindrical middle part 361 which the fibers 231,232 can be wound around. The spool is detachably arranged in the round fiber guide 201 with the top plate 362 extending to the outer wall 202 of the fiber guide 201. In this way, the fibers 231,232 are secured around the middle part 361 of the spool 360 by the top plate 361. The core 361 preferably encloses a central hollow region 364 extending through top plate 362, middle part 361 and bottom plate 363 in a longitudinal direction of the middle part 361 for receiving an attachment pin (not shown) fixed to the main body 200. The spool 360 may be provided rotatable or stationary when being arranged in the module.

Figure 5:
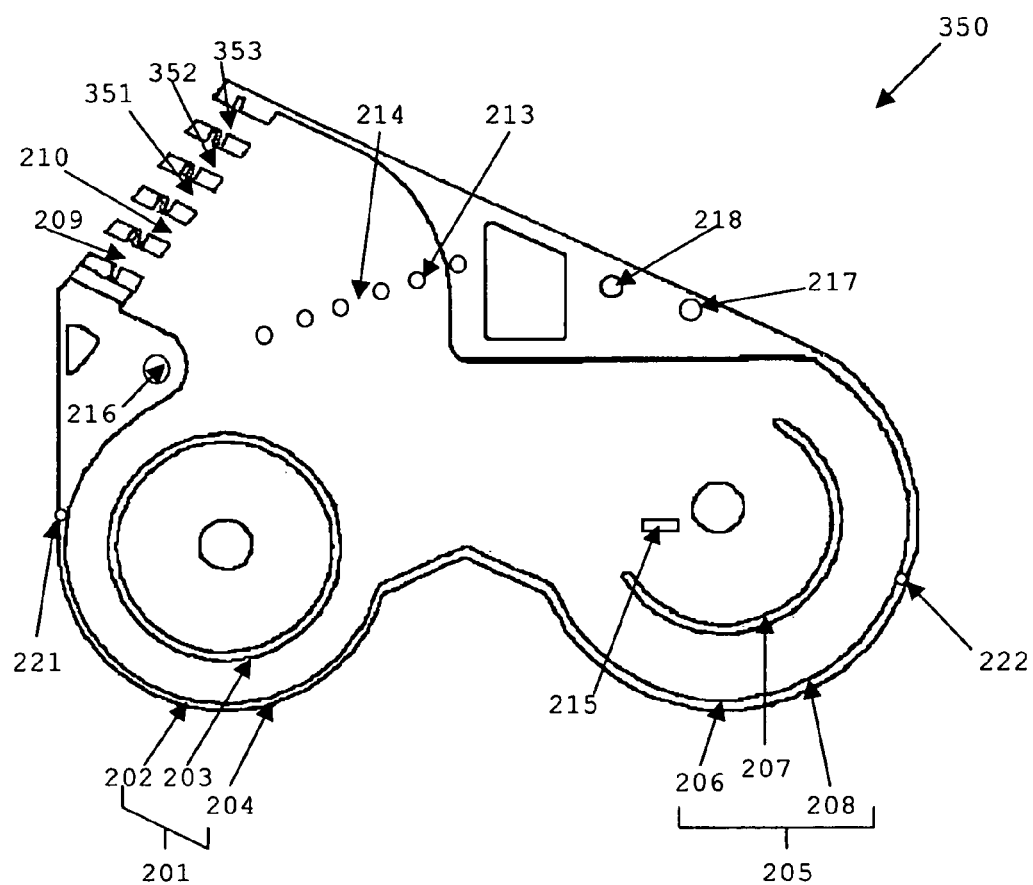
FIG. 5 shows the main body of the optical module comprising five openings in accordance with the invention.

It should be noted that the AWG module according to the invention may be expanded by having more openings in the form of elongated slots to accommodate more adapters when an AWG module with a greater number of channels (that is, a larger number of fibers in either the first or second optical fiber) is used. An example of an AWG module, which has been expanded by having five openings in the form of elongated slots when an AWG module with 32 channels is used, is shown in FIG. 5. The main body 350 now comprises of five openings 209, 210, 351, 352, 353. The other parts of the main body 350 are similar to the main body 200 shown in FIG. 2.

Figure 7:
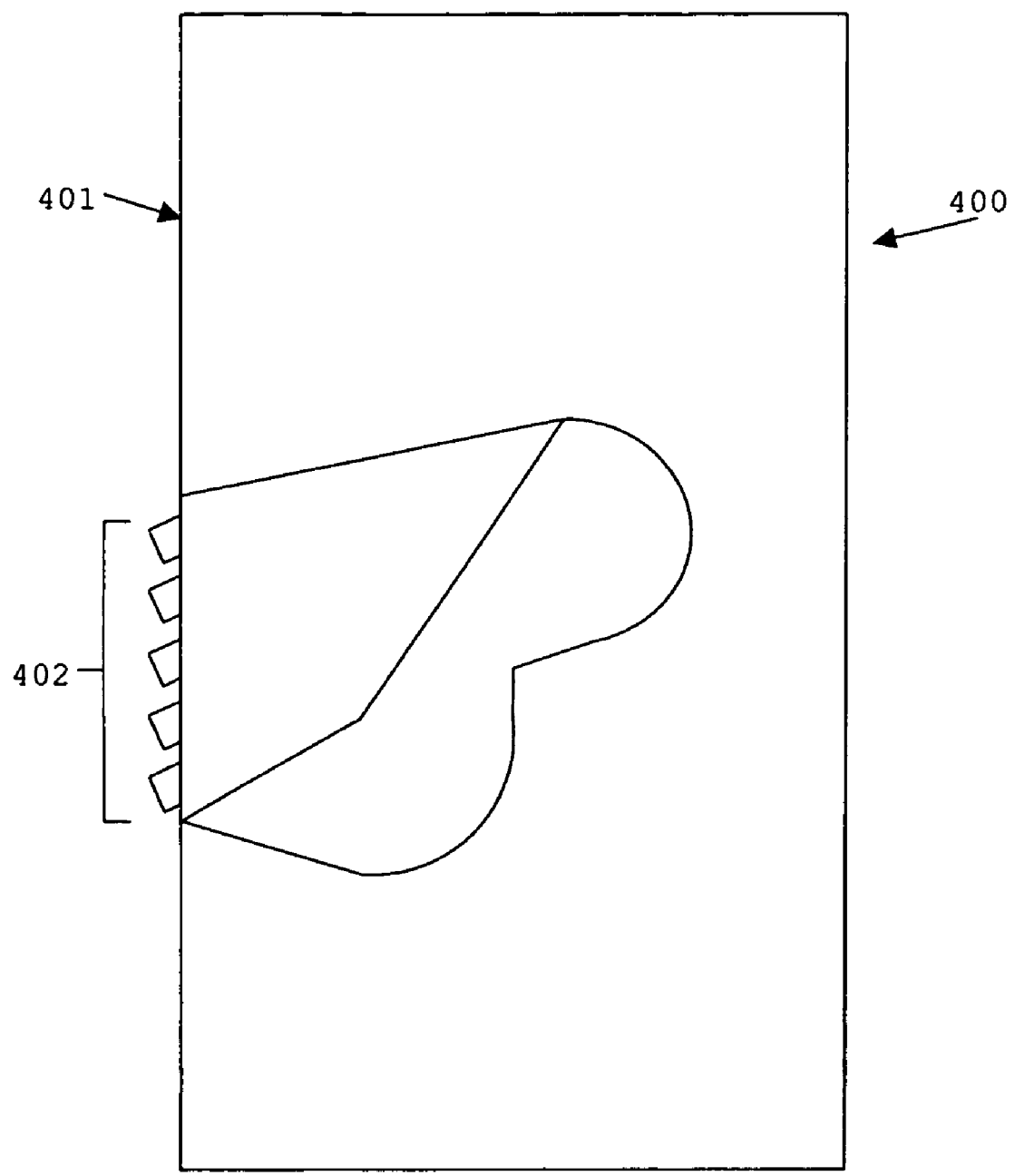
FIG. 7 shows the optical module mounted on the board of a rack-mount system according to the invention.

FIG. 7 shows an AWG module 400 with five adaptors, mounted vertically on a board 401 in a rack-mount system. It should be noted that the five adapters 402 arranged in the respective openings of the main body 350 are at an angle which is not perpendicular, but is less than 90 degrees, with respect the edge of the board 401. Hence when external connectors or fibers are attached to the adapters, the external connectors or fibers are not under excessive tensile strain in their resting position when the door of the rack-mount system is positioned near the board 401.

FIGS. 8 to 12 illustrate other embodiments of an AWG module in accordance with the invention. The AWG modules all individually comprise an AWG device 830, a housing 800, a first optical fiber 831 attached to one end of the AWG device 830 by a first V-groove block 865, and a bundle of optical fibers attached to the other end of the AWG device 830 by a second V-groove block 860. Each AWG module further comprises a set of input/output pins 815, and means for guiding one or more of the optical fibers within the housing 800.

Figure 8:
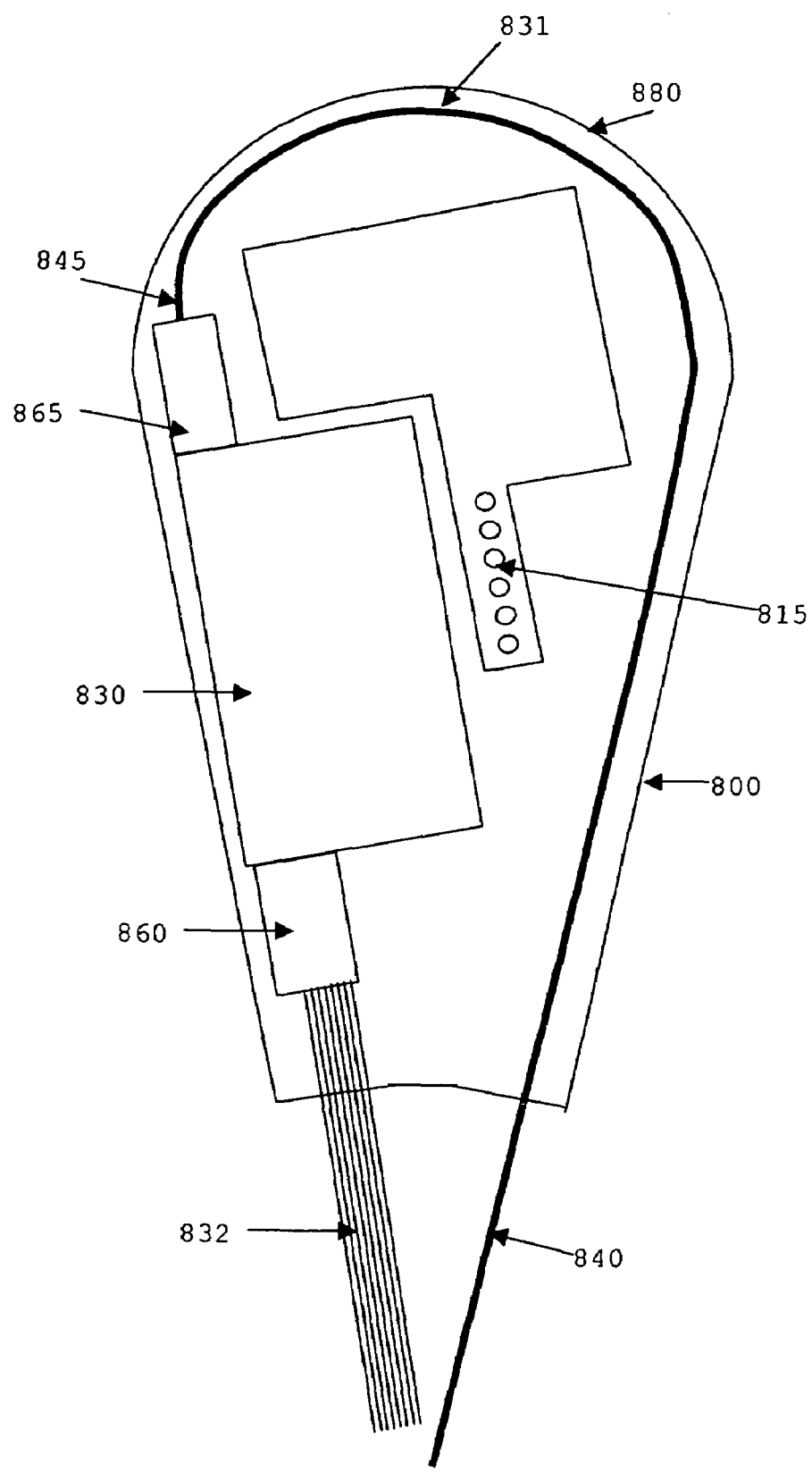
FIGS. 8 to 11 illustrate other embodiments of an AWG module in accordance wih the invention.

FIG. 8 illustrates an embodiment of an AWG module in which the housing 800 defines a concave curved surface portion 880 against which the optical fiber 831 is guided in a curved path. The curved path of the optical fiber 831 helps to isolate any pulling forces applied to the optical fiber 831 at the exposed end 840 from translating to (and possibly damaging) the attached end 845.

Figure 9:
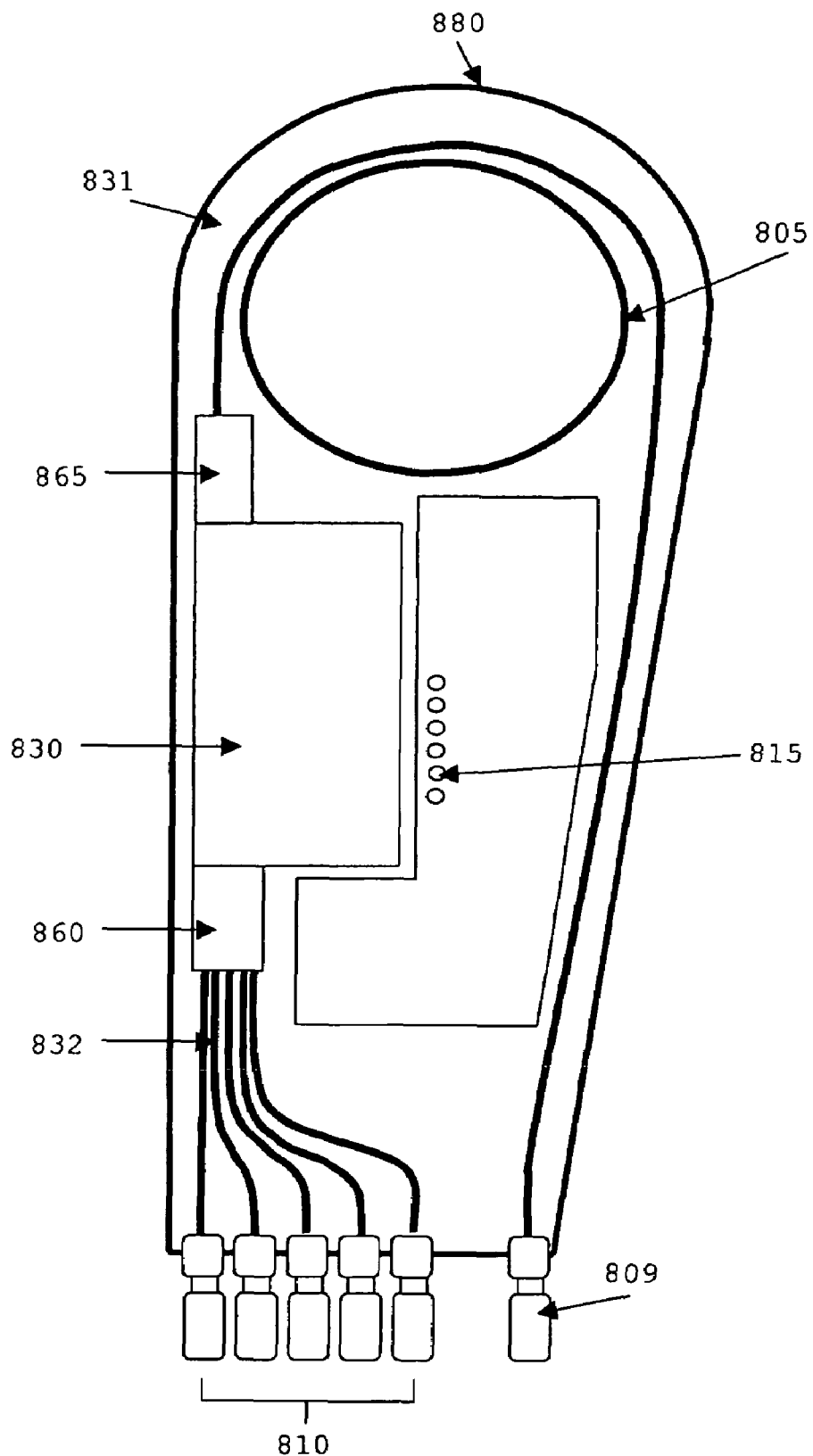

FIG. 9 illustrates a modified embodiment of the AWG module of FIG. 8. The AWG module further comprises an internal wall 805 within the housing 800 which defines a continuous convex surface against which the optical fiber is guided. The convex surface has a radius of curvature which is greater than the minimum recommended radius of curvature of the optical fiber 831. Hence, the convex surface helps to prevent the optical fiber from being damaged by being bent too tightly within the housing 800. Optical connectors 809 and 810 are provided at one end of the AWG module such that when the AWG module is mounted within a board of a rack-mount system the connectors can be aligned along an exposed edge of the board.

Figure 10:
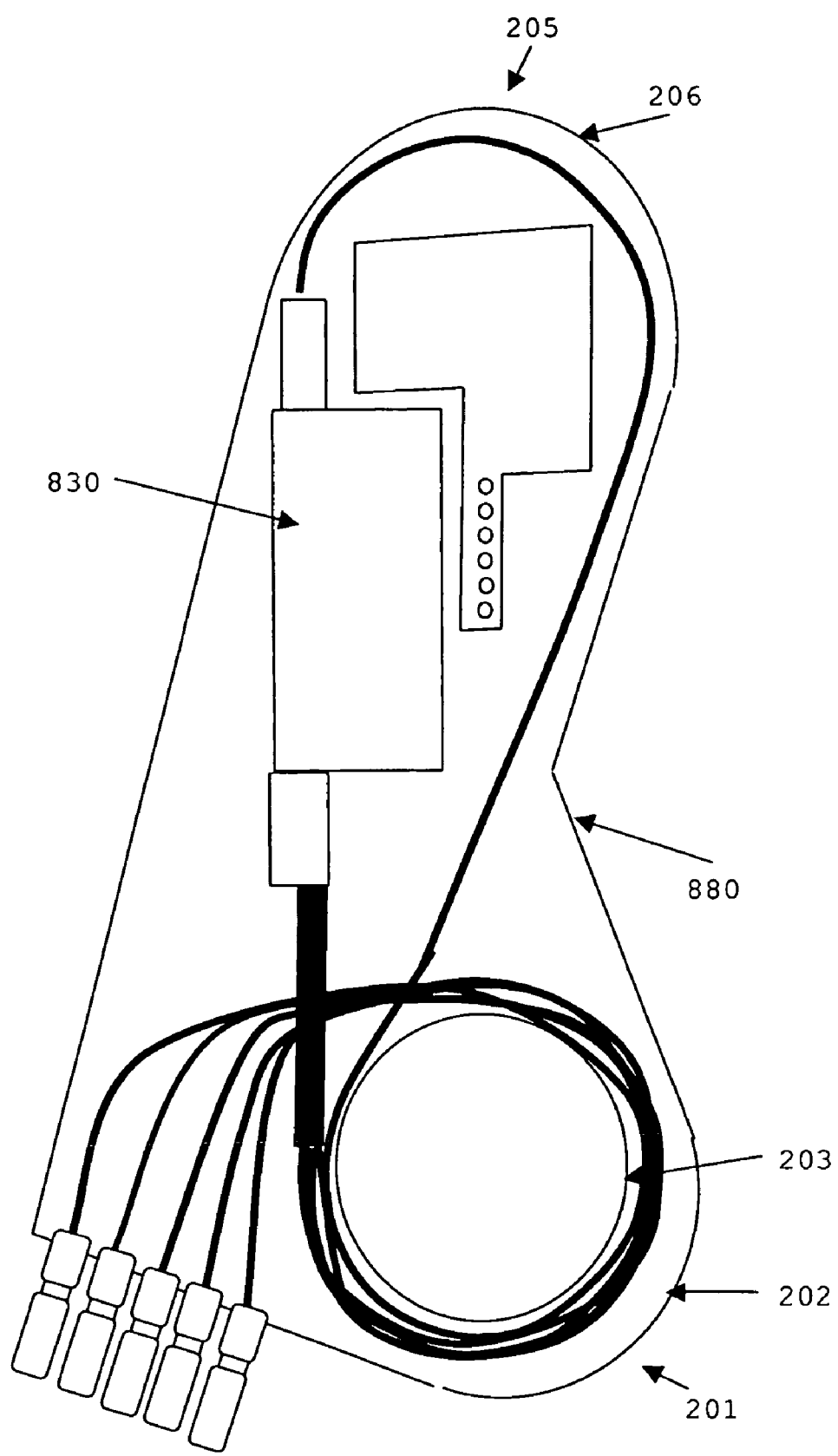

FIG. 10 illustrates a modified embodiment of the AWG module of FIG. 5 in which the internal wall 207 and the guides 213 have been removed.

Figure 11:
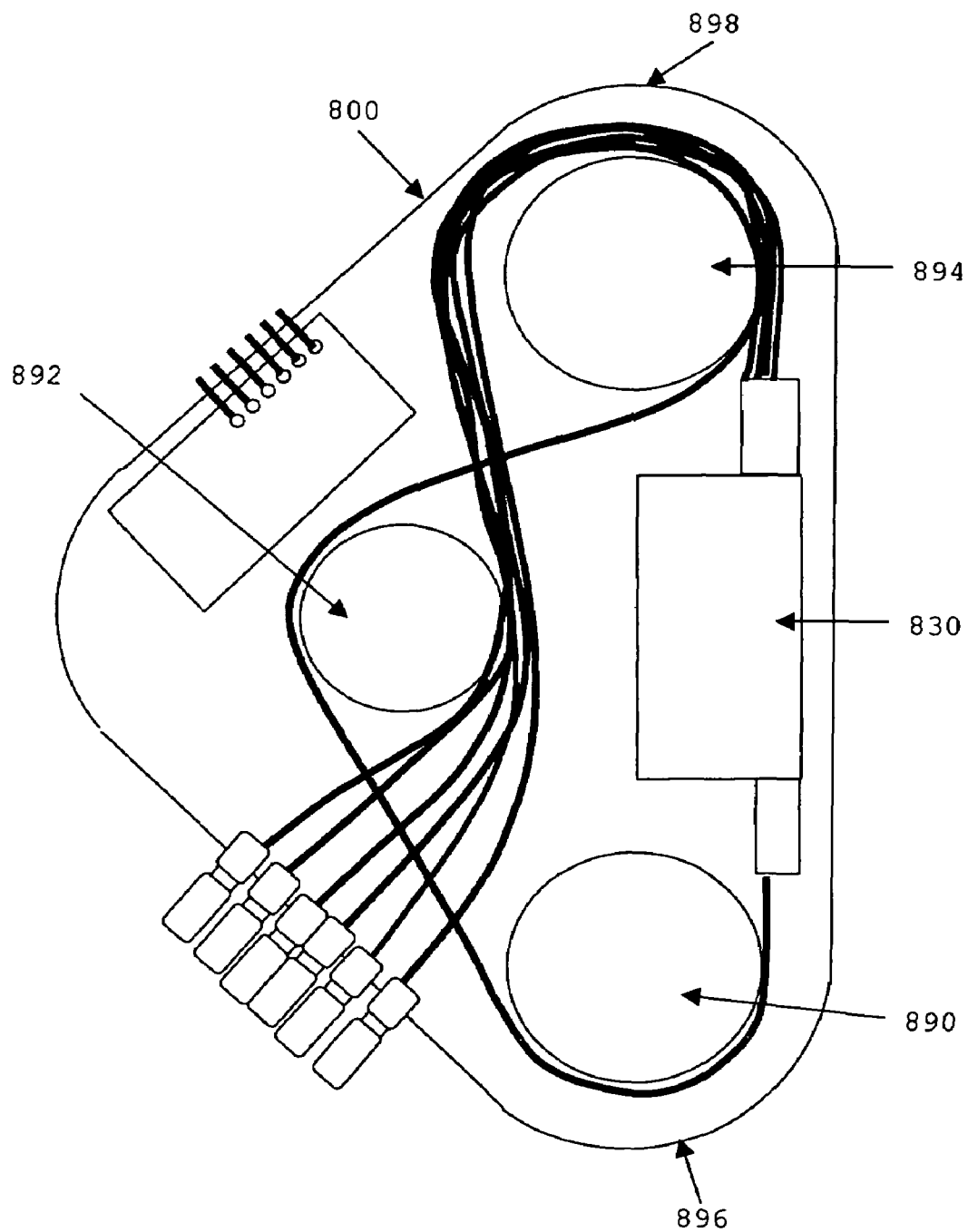

FIG. 11 illustrates an embodiment of an AWG module in accordance with the invention comprising a fiber guide formed by internal and external walls of the housing 800, and defining three continuous circular convex surfaces 890, 892, 894 against which the optical fibers are guided, and two concave curved surfaces 896, 898 against which the optical fibers are guided.

An AWG module in accordance with the invention provides an efficient system for managing the optical fibers so that the module can be shipped and installed onto a board without risk of damaging the optical fibers or the attachment between the optical fibers and the AWG device. The optional packing foam material or the detachable spool can help to secure the optical fibers in the AWG module, making it suitable to be shipped directly, with the main body, the top cover and the swing cover providing external protection to the AWG device. The AWG module can then be subsequently mounted onto the board of the rack-mount system to be used directly, hence eliminating the tedious and unproductive process of unpacking and installing the AWG module. Furthermore, the life span of the AWG module is increased, as possible damages to the optical fibers are greatly reduced due to the reduced handling of the AWG module.

While the invention have been described with reference to a preferred embodiment, the preferred embodiment is merely illustrative of the principles of the invention. Other embodiments and configurations may be devised without departing from the spirit of the invention and the scope of the appended claims.

What is claimed is:

1. An optical module for housing an optical component to which optical fibers are to be connected, wherein the optical module comprises:
   a casing;
   at least one elliptical fiber guide and at least one elliptically arcuate fiber guide which are arranged within the casing, spaced at a distance from each other so that optical fibers can be wound around one or more of said fiber guides individually and in combination;
   an accommodating space between the fiber guides for accommodating the optical component; and
   at least one opening provided in the casing and being arranged adjacent to one of the fiber guides for external connections to be made, wherein the opening has a center line substantially directed to the space between the fiber guides.

2. The optical module according to claim 1, wherein at least one guiding element is provided between the fiber guides and the at least one opening.

3. The optical module according to claim 1, and further comprising an accommodating space partially arranged in one of the fiber guides.

4. The optical module according to claim 1, wherein a fiber guide comprises an inner wall and an outer wall, wherein a channel is defined between the inner wall and the outer wall for guiding the optical fibers.

5. The optical module according to claim 1, further comprising a heating or cooling unit and at least one temperature sensor, wherein a plurality of input and output pins are coupled to the heating or cooling unit and temperature sensor, and extend to the outside of the optical module.

6. The optical module according to claim 1, wherein the optical component is an Arrayed Waveguide Grating device.

7. The optical module according to claim 2, wherein a plurality of guiding elements are provided between the at least one opening and the fiber guides as well as at a level between the space of the said fiber guides, and being arranged in a row.

8. The optical module according to claim 4, wherein at least one inner wall is of circular shape and is arranged concentrically with at least one outer wall that defines an arc of a concentric circle.

9. The optical module according to claim 1, wherein at least one of the fiber guides comprises a spool which is detachably arranged and around which the optical fibers can be wound.

10. The optical module according to claim 1, wherein the casing comprises a main body, a top cover and a swing cover.

11. The optical module according to claim 10, wherein the swing cover covers the portion above the at least one opening of the optical module, wherein the swing cover can be rotatably moved to expose the opening.

12. The optical module according to claim 10, wherein the main body, the top cover and the swing cover are held together using magnetic forces exerted by magnetic materials inserted into at least one region of the main body and corresponding regions of both the top cover and the swing cover.

13. The optical module according to claim 1, wherein excess lengths of one or more of said optical fibers from one or more said optical components are wound around one of said fiber guides.

14. The optical module according to claim 13, wherein said one of said fiber guides does not contain an optical component.

15. The optical module according to claim 1, wherein at least one of the fiber guides is circular.

16. An optical module for housing an optical component to which optical fibers are to be connected, wherein the optical module comprises:
   a casing;
   at least one elliptical fiber guide and at least one elliptically arcuate fiber guide which are arranged within the casing, spaced at a distance from each other so that optical fibers can be wound around one or more of said fiber guides individually and in combination;
   an accommodating space between the fiber guides for accommodating the optical component;
   at least one opening provided in the casing and being arranged adjacent to one of the fiber guides for external connections to be made; and
   a temperature controlling unit and at least one temperature sensor, wherein a plurality of input and output pins are coupled to the temperature controlling unit and the temperature sensor, and extend to the outside of the optical module.

17. The optical module according to claim 16, wherein at least one guiding element is provided between the fiber guides and the at least one opening.

18. The optical module according to claim 17, wherein a plurality of guiding elements are provided between the at least one opening and the fiber guides as well as at a level between the space of the said fiber guides and being arranged in a row.

19. The optical module according to claim 16, and further comprising an accommodating space partially arranged in one of the fiber guides.

20. The optical module according to claim 16, wherein the respective fiber guide comprises an inner wail and an outer wall, wherein a channel is defined between the inner wall and the outer wall for guiding the optical fibers.

21. The optical module according to claim 16, wherein the optical component is an Arrayed Waveguide Grating device.

22. The optical module according to claim 16, wherein at least one of the fiber guides comprises a spool which is detachably arranged and around which the optical fibers can be wound.

23. The optical module according to claim 16, wherein the casing comprises a main body, a top cover and a swing cover.

24. The optical module according to claim 23, wherein the swing cover covers the portion above the at least one opening of the optical module, wherein the swing cover can be rotatably moved to expose the opening.

25. The optical module according to claim 23, wherein the main body, the top cover and the swing cover are held together using magnetic forces exerted by magnetic materials inserted into at least one region of the main body and corresponding regions of both the top cover and the swing cover.

26. The optical module according to claim 16, wherein excess lengths of one or more of said optical fibers from one or more said optical components are wound around one of said fiber guides.

27. The optical module according to claim 16, wherein at least one of the fiber guides is circular.

* * * * *

UNITED STATES PATENT AND TRADEMARK OFFICE
CERTIFICATE OF CORRECTION

| | | |
|---|---|---|
| PATENT NO. | : 7,331,722 B2 | Page 1 of 1 |
| APPLICATION NO. | : 10/839819 | |
| DATED | : February 19, 2008 | |
| INVENTOR(S) | : Chee Siong Tan | |

It is certified that error appears in the above-identified patent and that said Letters Patent is hereby corrected as shown below:

Column 12, Line 36, Claim 15, delete "the fiber" and insert -- the elliptical fiber --;

Column 12, Line 61, Claim 18, delete "guides" and insert -- guides, --;

Column 12, Line 67, Claim 20, delete "wail" and insert -- wall --.

Signed and Sealed this

Eighth Day of June, 2010

David J. Kappos
*Director of the United States Patent and Trademark Office*